US011110953B2

United States Patent
Lingemann et al.

(10) Patent No.: US 11,110,953 B2
(45) Date of Patent: Sep. 7, 2021

(54) LOCKING DEVICE FOR AN ADJUSTABLE STEERING COLUMN ASSEMBLY

(71) Applicant: TRW Automotive GmbH, Alfdorf (DE)

(72) Inventors: Markus Lingemann, Bochum (DE); Marcus Zimpel, Erkrath (DE)

(73) Assignee: ZF Automotive Germany GmbH, Alfdorf (DE)

( * ) Notice: Subject to any disclaimer, the term of this patent is extended or adjusted under 35 U.S.C. 154(b) by 0 days.

(21) Appl. No.: 16/666,530

(22) Filed: Oct. 29, 2019

(65) Prior Publication Data

US 2020/0406951 A1 Dec. 31, 2020

(30) Foreign Application Priority Data

Nov. 9, 2018 (DE) .......................... 102018128119.6

(51) Int. Cl.
*B62D 1/184* (2006.01)
*B62D 1/187* (2006.01)

(52) U.S. Cl.
CPC ............. *B62D 1/184* (2013.01); *B62D 1/187* (2013.01)

(58) Field of Classification Search
CPC ......... B62D 1/184; B62D 1/185; B62D 1/187
See application file for complete search history.

(56) References Cited

U.S. PATENT DOCUMENTS

| 8,661,930 | B2 * | 3/2014 | Okada | B62D 1/184 74/493 |
| 8,991,863 | B2 * | 3/2015 | Hahn | B62D 1/184 280/775 |
| 9,150,241 | B2 * | 10/2015 | Nakazato | B62D 1/184 |
| 9,193,376 | B2 * | 11/2015 | Cron | B62D 1/184 |
| 9,260,131 | B2 * | 2/2016 | Wilkes | B62D 1/187 |
| 9,446,780 | B2 * | 9/2016 | Yamada | B62D 1/187 |
| 9,522,693 | B2 * | 12/2016 | Tomaru | B62D 1/187 |
| 9,932,061 | B2 * | 4/2018 | Butler | B62D 1/187 |
| 10,196,080 | B2 * | 2/2019 | Kim | B62D 1/195 |

(Continued)

FOREIGN PATENT DOCUMENTS

DE 202012102166 U1 7/2012
DE 112014002753 T5 3/2016

(Continued)

*Primary Examiner* — Laura Freedman
(74) *Attorney, Agent, or Firm* — Robert James Harwood (57) ABSTRACT

A locking device is presented for an adjustable steering column assembly for a motor vehicle, comprising an actuating element and a damping device. The damping device has a first damping element and a second damping element, wherein the first damping element is attached to the actuating element and the second damping element is attached to a frame part, wherein the first and/or second damping element relative to the other damping element are rotatably mounted. The first and the second damping element each have a coupling section, wherein the coupling sections are engaged at least over a partial section of a movement of the actuating element, and wherein a relative rotation between the two damping elements is damped by deformation of the first and/or second damping element and/or by friction, at least over a partial section of a movement of the actuating element.

18 Claims, 5 Drawing Sheets

(56) References Cited

U.S. PATENT DOCUMENTS

| | | |
|---|---|---|
| 2006/0273567 A1* | 12/2006 | Fix .................... B62D 1/184 |
| | | 280/775 |
| 2015/0090068 A1 | 4/2015 | Anspaugh et al. |
| 2015/0360712 A1* | 12/2015 | Baumeister ............ B62D 1/19 |
| | | 403/53 |
| 2016/0272234 A1 | 9/2016 | Terasawa et al. |
| 2017/0267273 A1 | 9/2017 | Jones et al. |

FOREIGN PATENT DOCUMENTS

| | | | |
|---|---|---|---|
| DE | 102015203541 B3 | 6/2016 | |
| EP | 0242928 A1 | 10/1987 | |
| EP | 1795425 B1 | 2/2010 | |
| FR | 2822782 A1 * | 10/2002 | ............. B62D 1/184 |
| GB | 2352286 A * | 1/2001 | ............. B62D 1/184 |
| WO | 2013001284 A1 | 1/2013 | |

\* cited by examiner

LOCKING DEVICE FOR AN ADJUSTABLE STEERING COLUMN ASSEMBLY

CROSS-REFERENCE TO RELATED APPLICATION

This application claims priority to German Patent Application No. 102018128119.6, filed Nov. 9, 2018, the disclosure of which is incorporated herein by reference in its entirety.

TECHNICAL FIELD

The present disclosure relates to a locking device for an adjustable steering column assembly.

BACKGROUND

Locking devices for adjustable steering column assemblies are known in a number of variants from the prior art.

In a typical embodiment, the locking device has an open and a closed position, wherein in the open position a steering wheel is adjustable for a length adjustment and/or a tilt adjustment, while in the closed position the steering wheel is locked for adjustment.

In order to switch the locking device between the open and closed position, the locking device usually has a lever or the like, which can be operated by the driver for switching between the two positions. The force required for switching, however, can be extremely uneven over the actuating path of the lever from the closed to the open position. Typically, a relatively large force is necessary for operating the lever initially, but then said force decreases rapidly.

Applying the required force may be perceived by the driver as an unpleasant sensation, as the locking device has no tactile feedback when the lever is reaching a final position. For instance, the lever can suddenly stop at said final position. Therefore, the object of the present disclosure is to provide a locking device for an adjustable steering column assembly in which the disadvantages of the prior art are eliminated.

SUMMARY

The object is achieved according to the present disclosure by a locking device for an adjustable steering column assembly for a motor vehicle comprising an actuating element and a damping device. The locking device has at least one open and one closed position, wherein in the open position a steering column is released for longitudinal adjustment and/or tilt adjustment, and in the closed position the steering column is locked for a longitudinal adjustment and/or a tilt adjustment. The actuating element is adapted to move the locking device between the closed and the open position, wherein the actuating element has a first position which corresponds to the closed position of the locking device, and a second position which corresponds to the open position of the locking device. The damping device has a first damping element and a second damping element, wherein the first damping element is attached to the actuating element and the second damping element is attached to a frame part, wherein the first and/or second damping element is rotatably mounted relative to the other damping element. The first and the second damping element each have a coupling section, wherein the coupling sections are engaged at least over a partial section of a movement of the actuating element between the first and the second position, and wherein a relative rotation between the two damping elements is damped by deformation of the first and/or second damping element and/or by friction, at least over a partial section of a movement of the actuating element between the first and the second position.

According to the present disclosure, therefore, the movement of the actuating element between the first and the second position is at least partially damped by the two damping elements, wherein the damping by friction between the two damping elements occurs by internal friction of at least one of the two damping elements and/or by deformation of at least one of the two damping elements. When the relative movement is partially damped, the locking device opposes a resistance felt by the driver at least when the actuating element is initially activated. By means of said resistance a tactile feedback is given to the driver, meaning that the locking device is reaching the open position. In this way, it can also be avoided that the actuating element noisily hits the stop position adapted to restrict the movement.

In particular, those partial sections of the movement of the actuating element over which the relative movement is damped, are determined in a manner that when opening the locking device, the actuating force is increased when the locking device is reaching the open position.

Preferably, the relative rotation between the two damping elements is damped only over a partial section of the movement of the actuating element between the first and the second position of the actuating element, wherein the closed and/or the open position is/are outside the partial section. Thus, the coupling sections are engaged only over these partial sections. In this embodiment of the present disclosure, a more uniform force takes place over the actuating distance of the actuating element, since the necessary actuating force is increased at least in the partial sections, and thus adapted to the large actuating force when reaching the first position.

More preferably, the coupling sections are formed by a previously generated indentation on one of the two damping elements and a protrusion on the other of the two damping elements. The indentation and the protrusion are designed in particular in a manner that they are engaged in case of a relative rotation between the two damping elements over a predefined angular range. The predefined angular range corresponds to a partial section of the movement of the actuating element between the first and the second position, over which partial section the movement of the actuating element is damped.

In accordance with one aspect of the present disclosure, the first and the second damping element have contact surfaces corresponding to each other which define the first and/or second position of the actuating element. Thus, the actuating distance of the actuating element can be limited in a simple manner and without additional components, in particular without additional stops.

For example, if the second damping element is rotatably attached to the frame part, then the second damping element, more specifically at least one contact surface of the second damping element, creates a stop for the first damping element, said stop restricting the movement of the actuating element.

According to a further aspect of the present disclosure, the first damping element relative to the actuating element is rotatably attached to the actuating element. Preferably, the second damping element is then rotatably attached to the frame part. When actuating the damping elements, the first damping element then performs a combined pivoting and rotational movement with respect to the second damping element, wherein the coupling sections of the two damping devices are engaged at least over a partial section of the combined rotational and pivoting movement.

An embodiment of the present disclosure provides that the first damping element comprises a sleeve element including the coupling section, and a fixing element attached to the actuating element, wherein the sleeve element and the fixing element are rotatable relative to each other. If the coupling sections of both damping devices are engaged, then the sleeve element and the fixing element are rotated against each other while the actuating element is moving. The movement of the actuating element is damped by friction between the sleeve element and the fixing element.

In particular, the contact surfaces between the sleeve element and the fixing element have a predefined coefficient of friction. By "predefined" is to be understood in this context that the surface materials of the sleeve member and the fixing element, which are in contact with each other, are specifically selected to produce a certain friction force in a relative rotation.

It may be provided a spring element that counteracts the movement of the actuating element from the first toward the second position. Due to the spring element the movement of the actuating element is damped progressively. Since the restoring force of the spring element increases along the actuating path, the spring element effectively prevents that the actuating element hits a stop position with too much force, said stop position being defined as the second position.

According to a further embodiment of the present disclosure, the spring element is attached to the actuating element and acts together with the first and/or the second damping element. In particular, the spring element is attached to the first and/or the second damping element.

Alternatively, the spring element may be attached to the two damping elements.

BRIEF DESCRIPTION OF THE DRAWINGS

Further advantages and features of the present disclosure will become apparent from the following description and the accompanying drawings, to which reference is made. In which are shown.

DETAILED DESCRIPTION

Figure 1:
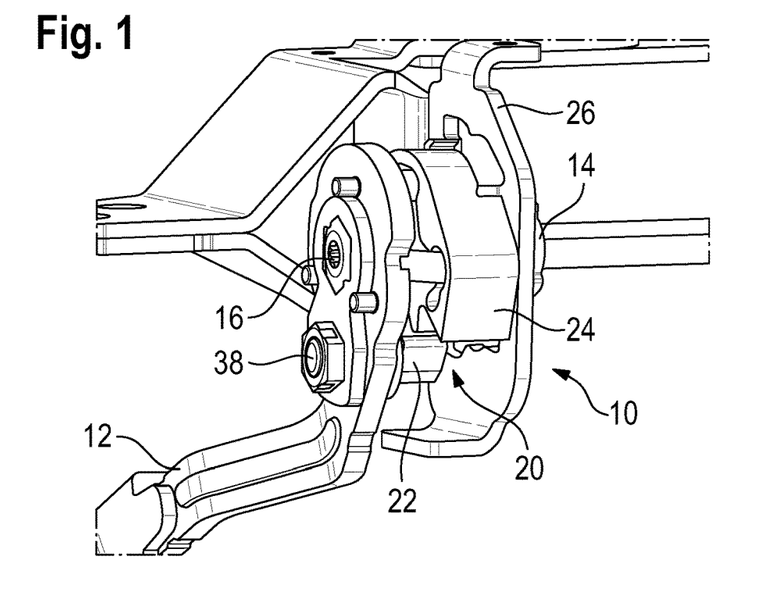
FIG. 1 is a locking device according to the present disclosure.
Figure 2:
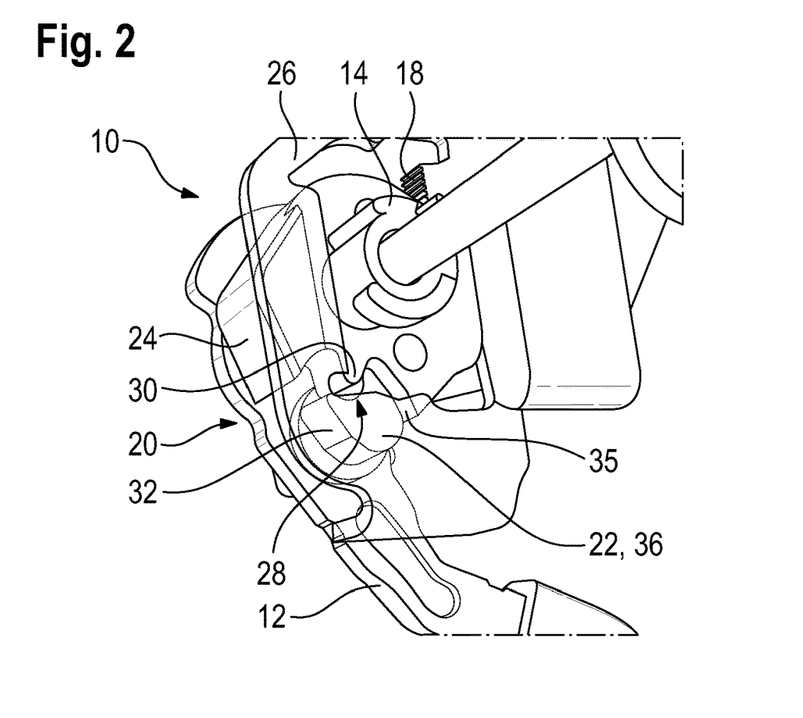
FIG. 2 is a view of the locking device of FIG. 1 rotated about 90°.

In FIGS. 1 and 2, a locking device 10 for an adjustable steering column assembly for a motor vehicle is shown. The locking device 10 comprises an actuating element 12, which is formed as a lever. By means of the actuating element 12 the locking device 10 is adjustable between an open position and a closed position, wherein in the open position a steering column is released for longitudinal adjustment and/or tilt adjustment, and in the closed position the steering column is locked for a longitudinal adjustment and/or a tilt adjustment. Accordingly, the actuating element 12 has a first position corresponding to the closed position of the locking device 10, and a second position corresponding to the open position of the locking device 10.

A cam bracket 14 is located in the open position of the locking device 10 as shown in FIGS. 1 and 2, said cam bracket 14 connected via a fastening pin 16 with the actuating element 12, not engaged with one locking block 18 fastened to the steering column, for which reason, the longitudinal adjustment and/or tilt adjustment of the steering column is released. If the locking device 10 is moved from the open to the closed position, the cam bracket 14 and the locking block 18 are held in clamping engagement, by means of which the longitudinal adjustment and/or the tilt adjustment of the steering column is locked.

The clamping mechanism between the cam bracket 14 and the locking block 18 is merely an example discussed here to better explain the mode of action of the locking device 10. Of course, the locking device 10 may also comprise any other suitable locking and release mechanism for the longitudinal and/or tilt adjustment of the steering column. The locking device 10 further comprises a damping device 20 having a first damping element 22 and a second damping element 24.

In the embodiment shown, the first damping element 22 with respect to the actuating element 12 is rotatably attached to the actuating element 12, while the second damping element 24 is non-rotatably attached to a frame part 26 of the motor vehicle.

Figure 3A:
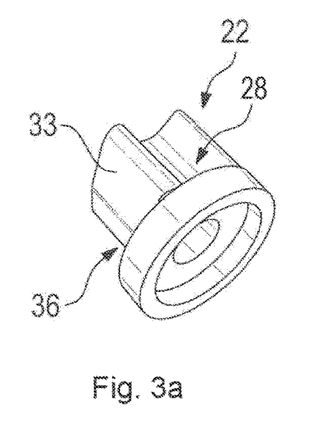
FIG. 3(a) shows a first view of a first damping element of the locking device of FIG. 1.
Figure 3B:
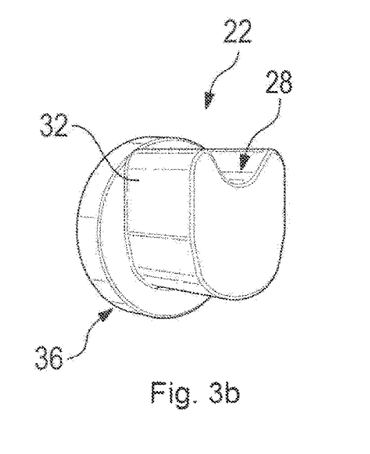
FIG. 3(b) shows a second view of a first damping element of the locking device of FIG. 1.
Figure 3C:
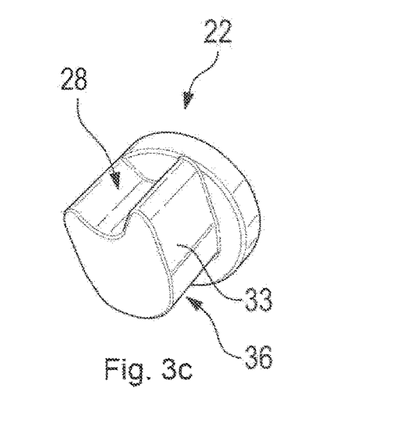
FIG. 3(c) shows a third view of a first damping element of the locking device of FIG. 1.
Figure 4A:
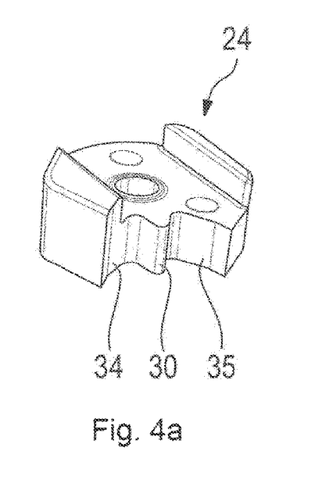
FIG. 4(a) shows a first view of a second damping element of the locking device of FIG. 1.
Figure 4B:
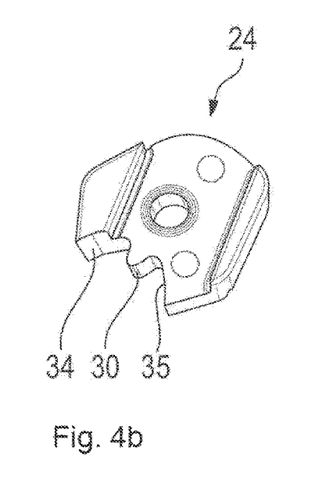
FIG. 4(b) shows a second view of a second damping element of the locking device of FIG. 1.
Figure 4C:
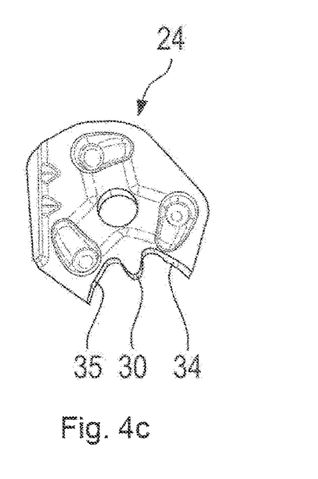
FIG. 4(c) shows a third view of a second damping element of the locking device of FIG. 1.
Figure 5A:
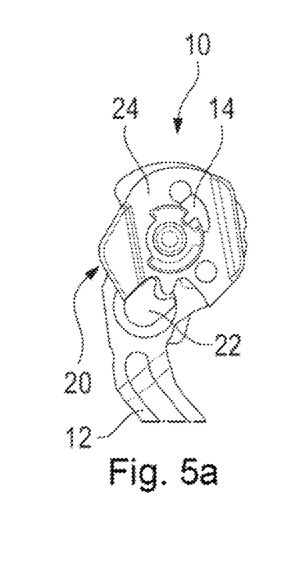
FIG. 5(a) shows a first side view of the locking device of FIG. 1.
Figure 5B:
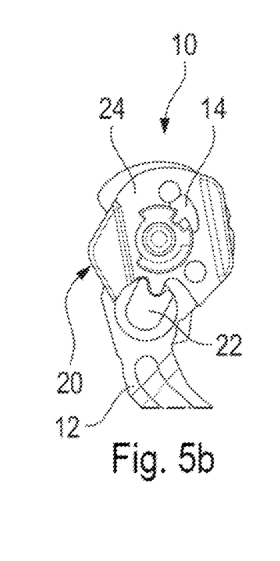
FIG. 5(b) shows a second side view of the locking device of FIG. 1.
Figure 5C:
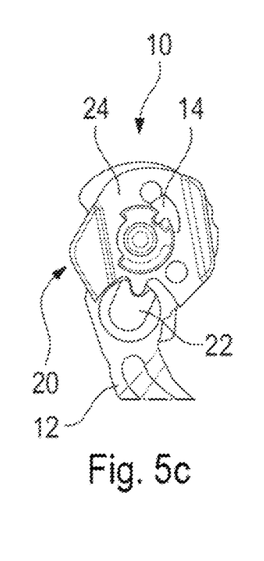
FIG. 5(c) shows a third side view of the locking device of FIG. 1.
Figure 5D:
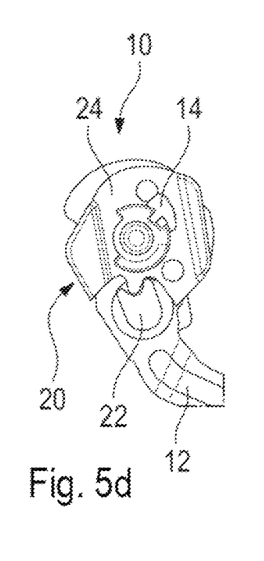
FIG. 5(d) shows a fourth side view of the locking device of FIG. 1.
Figure 5E:
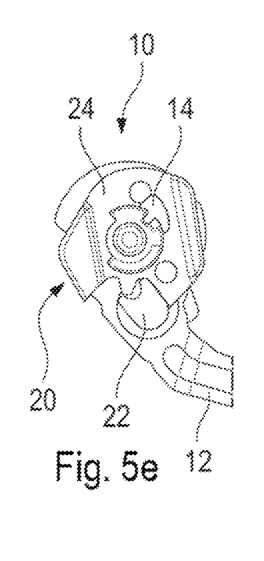
FIG. 5(e) shows a fifth side view of the locking device of FIG. 1.

Alternatively, however, the first damping element 22 could be fixedly attached to the actuating element 12 and the second damping element 24 with respect to the frame part 26 could be rotatably attached to the frame part 26. The key factor is that the first damping element 22 and the second damping element 24 are rotatably mounted relative to each other, in addition to the pivoting movement, which is generated by the actuating element 12. The first damping element 22 and the second damping element 24 are shown in FIGS. 3 (a) to (c) and 4 (a) to (c) in a detail view.

The first damping element 22 and the second damping element 24 have coupling sections 28, 30 corresponding to each other which are engaged over a partial section of a movement of the actuating element 12 between the first and the second position. The coupling section 28 of the first damping element 22 is formed, for example, as a rounded indentation, whereas the coupling section 30 of the second damping element 24 is formed as a protrusion, for example, in the form of a rounded tooth.

Furthermore, the first damping element 22 has a first contact surface 32 and a second contact surface 33. Similarly, the second damping element 24 has a first contact surface 34 and a second contact surface 35. In this case, the first contact surfaces 32, 34 are corresponding to each other and limit the movement of the actuating element 12 toward the first position. Similarly, the second contact surfaces 33, 35 are corresponding to each other and limit the movement of the actuating element 12 toward the second position. The first contact surfaces 32, 34 and the second contact surfaces 33, 35 define the first and the second position of the actuating element. While the coupling sections 28, 30 are engaged, a relative movement of the two damping elements 22, 24 is damped through at least one of the following mechanisms: (elastic) deformation of the first damping element 22, (elastic) deformation of the second damping element 24, friction between the two damping elements 22, 24 and/or internal friction in one of the two damping elements 22, 24.

The operation of the locking device 10 is explained in more detail below with reference to FIGS. 5 (a) to (e). In FIG. 5 (a), the closed position of the locking device 10 is shown. The first contact surfaces 32, 34 of the two damping elements 22, 24 are fully in contact, by means of which a further movement of the actuating element 12 is prevented in this direction. The coupling sections 28, 30 of the two damping elements 22, 24 are not in contacting engagement, for which reason a movement of the actuating element 12 from the first position toward the second position is not damped by the damping device 20 over a first partial section of the movement.

In FIGS. 5 (b) to (d), a middle partial section of the movement of the actuating element 12 is shown from the first position to the second position. The coupling sections 28, 30 are located over this partial section in contacting engagement and the movement of the actuating element 12 is damped over this partial section by at least one of the mechanisms described above. FIG. 5 (e) shows the open position of the locking device 10, that is, the second position of the actuating element 12. The second contact surfaces 33, 35 of the two damping elements 22, 24 are in contact over the entire surface, by means of which a further movement of the actuating element is prevented 12. The coupling sections 28, 30 of the two damping elements 22, 24 are not in engagement any more, for which reason a movement of the actuating element 12 from the first position toward the second position is not damped by the damping device 20 over a last partial section of the movement.

Figure 6:
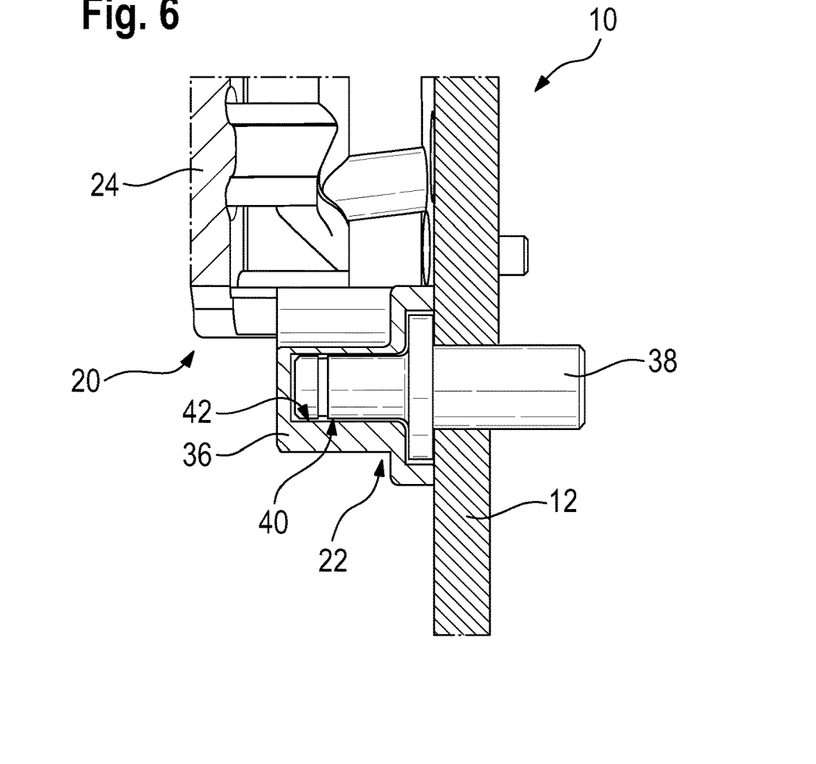
FIG. 6 shows a cross section through the locking device of FIG. 1 according to a first embodiment.

The operation of the damping device 20 is explained in detail below with reference to FIGS. 6 to 9. FIG. 6 shows a first embodiment of the damping device 20 in a cross section. In this embodiment, the first damping element 22 comprises a sleeve element 36 and a fixing element 38. In this case, the sleeve element 36 comprises the coupling section 28 of the first damping element 22. The sleeve element 36 is attached to the actuating element 12 by means of the fixing element 38, and relative to the fixing element 38 is rotatably arranged on the fixing element 38. The contact surfaces 40, 42 between the sleeve element 36 and fixing element 38 are formed as friction surfaces and have a predefined coefficient of friction.

The coefficient of friction is determined in a manner that in case of a relative rotation between the sleeve element 36 and the fixing element 38, a desired friction force is created that counteracts the movement of the actuating element 12, by means of which the movement of the actuating element 12 is damped. In this embodiment, the movement of the actuating element 12 is damped by internal friction in the first damping element 22.

Figure 7:
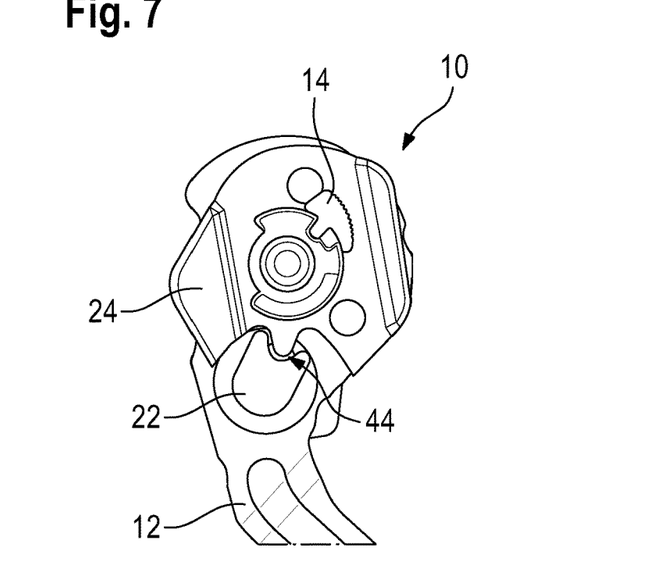
FIG. 7 shows a side view of the locking device of FIG. 1 according to a second embodiment.

FIG. 7 shows a second embodiment of the damping device 20 in a side view. Alternatively or in addition to the above-described damping by friction, the coupling sections 28, 30 are in this case designed in a manner that at least one of the two coupling sections 28, 30 is elastically deformed when the coupling sections 28, 30 are engaged. This is indicated in FIG. 7 by a compression region 44. By deformation of at least one of the coupling sections 28, 30, a part of the kinetic energy of the actuating element 12 is absorbed and the movement of the actuating element 12 is damped.

Figure 8:
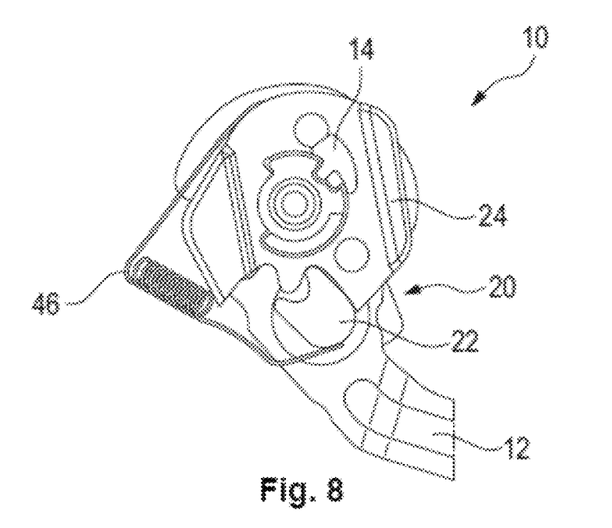
FIG. 8 shows a side view of the locking device of FIG. 1 according to a third embodiment.
Figure 9A:
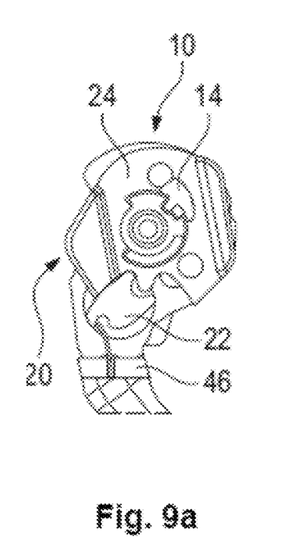
FIG. 9(a) shows a first side view of the locking device according to a fourth embodiment.
Figure 9B:
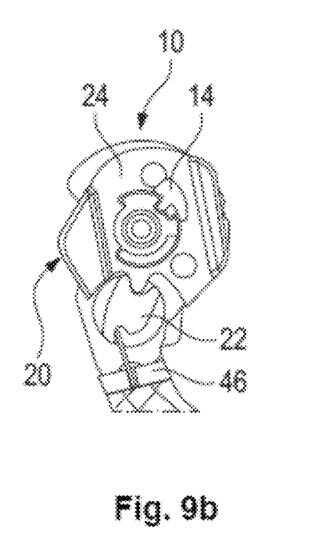
FIG. 9(b) shows a second side view of the locking device according to a fourth embodiment.
Figure 9C:
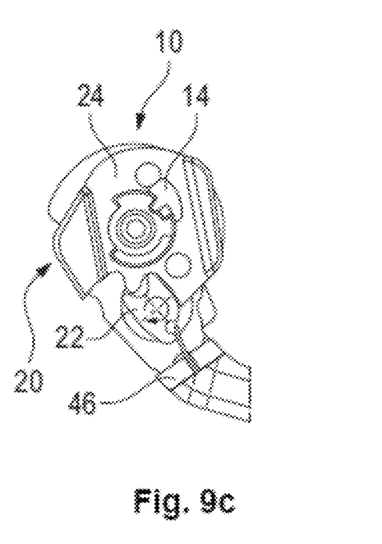
FIG. 9(c) shows a third side view of the locking device according to a fourth embodiment.

In FIGS. 8 and 9, two different variants of a third embodiment of the locking device 10 are shown in a side view. Alternatively or in addition to the above-described damping mechanisms, in this case the locking device 10 comprises a spring element 46, which counteracts a movement of the actuating element 12 from the first toward the second position. In the variant shown in FIG. 8, the spring element 46 having two respective ends is attached to both damping elements 22, 24, said spring element 46 acting on the actuating element 12 over the two damping elements 22, 24 to reach the first position, and thus, the locking device 10 is set in the closed position. The spring element 46 provides an increasing restoring force over the actuating distance of the actuating element from the first position toward the second position.

The variant shown in FIG. 9 differs from the variant shown in FIG. 8 in that the spring element 46 is attached directly to the actuating element 12, and the first damping element 22 is acted on to reach a position which corresponds to the first position of the actuating element 12. Accordingly, the first position of the actuating element 12 shown in FIG. 9 (a) corresponds to a released position of the spring element 46, while the spring element 46 generates a constantly increasing restoring force when the actuating element 12 moves into the second position as shown in FIGS. 9 (b) and (c). The first damping element 22 is preferably made of plastic. The second damping element 24 is preferably made of metal. In particular, the second damping element 24 is a sintered component.

What is claimed is:

1. A locking device for an adjustable steering column assembly for a motor vehicle, with an actuating element and a damping device,
    wherein the locking device comprises at least one open position and at least one closed position, wherein in the open position a steering column is released for a longitudinal adjustment and/or a tilt adjustment, and in the closed position the steering column is locked for the longitudinal adjustment and/or the tilt adjustment,
    wherein the actuating element is adapted to move the locking device between the closed and the open positions, wherein the actuating element has a first position which corresponds to the closed position of the locking device, and a second position which corresponds to the open position of the locking device, movement of the actuating element from the first position toward the second position including a first partial section of movement, a middle partial section of movement, and a last partial section of movement, wherein the damping device has a first damping element and a second damping element, wherein the first damping element is attached to the actuating element, and the second damping element is attached to a frame part, wherein the first or second damping element is rotatably mounted relative to the other of the first or second damping element, wherein the first and second damping elements each have a coupling section, wherein the coupling sections are engaged with each other during the middle partial section of the movement of the actuating element from the first position to the second position, and wherein a relative rotation of the first and the second damping elements is damped by deformation of at least one of the first and the second damping elements and by friction only during the middle partial section of the movement of the actuating element from the first position to the second position.

2. The locking device according to claim 1 wherein the coupling sections are formed by an indentation on one of the first and the second damping elements and a protrusion on the other of the first and the second damping elements.

3. The locking device according to claim 2 wherein the first and the second damping elements have contact surfaces corresponding to each other which define at least one of the first and the second positions of the actuating element.

4. The locking device according to claim 3 wherein the first damping element is rotatably attached to the actuating element and is rotatable relative to the actuating element.

5. The locking device according to claim 4, wherein the first damping element comprises a sleeve element including the coupling section, and a fixing element attached to the actuating element, wherein the sleeve element and the fixing element are rotatable relative to each other.

6. The locking device according to claim 5, characterized in that contact surfaces between the sleeve element and the fixing element have a predefined coefficient of friction.

7. The locking device according to claim 6 wherein a spring element is provided, which counteracts a movement of the actuating element from the first position toward the second position.

8. The locking device according to claim 7, wherein the spring element is attached to the actuating element and acts together with at least one of the first and the second damping elements, the spring element being attached to at least one of the first and the second damping elements.

9. The locking device according to claim 7, wherein the spring element is attached to the first and the second damping elements.

10. The locking device according to claim 1, wherein the coupling sections are not engaged with each other during the first and last partial sections of the movement of the actuating element from the first position to the second position.

11. The locking device according to claim 10, wherein a relative rotation of the first and the second damping elements is not damped during the first and last partial sections of the movement of the actuating element from the first position to the second position.

12. A locking device for an adjustable steering column assembly for a motor vehicle, the locking device having open and closed positions, a steering column being released for a longitudinal adjustment and/or a tilt adjustment when the locking device is in the open position, the steering column being locked for one of the longitudinal adjustment and the tilt adjustment when the locking device is in the closed position, the locking device comprising:

an actuating element adapted to move the locking device between the closed and open positions of the locking device, the actuating element having a first position which corresponds to the closed position of the locking device, and a second position which corresponds to the open position of the locking device;

a damping device having first and second damping elements that are rotatable relative to one another, the first damping element comprising a sleeve element having a coupling section, and a fixing element attached to the actuating element, the sleeve element and the fixing element being rotatable relative to each other, the second damping element being attached to a frame part and having a coupling section, the coupling sections being engaged with each other at least over a partial section of a movement of the actuating element between the first and the second positions, relative rotation of the first and the second damping elements is damped by deformation of at least one of the first and the second damping elements and by friction, at least over the partial section of the movement of the actuating element between the first and the second positions.

13. The locking device according to claim 12, wherein the relative rotation of the first and second damping elements is damped only over the partial section of the movement of the actuating element between the first and the second positions of the actuating element, wherein the open and closed positions are outside the partial section.

14. The locking device according to claim 12, wherein the coupling sections are formed by an indentation on one of the first and second damping elements and a protrusion on the other of the first and second damping elements.

15. The locking device according to claim 12, wherein the first and the second damping elements have contact surfaces corresponding to each other which define at least one of the first and the second positions of the actuating element.

16. The locking device according to claim 12, further comprising a spring element that counteracts the movement of the actuating element from the first position toward the second position.

17. The locking device according to claim 16, wherein the spring element is attached to the actuating element and acts together with at least one of the first and the second damping elements, the spring element being attached to at least one of the first and second damping elements.

18. The locking device according to claim 16, wherein the spring element is attached to the first and second damping elements.

* * * * *